(12) United States Patent
Moro et al.

(10) Patent No.: US 6,486,456 B1
(45) Date of Patent: Nov. 26, 2002

(54) FUSING PROCESSING METHOD

(75) Inventors: Kyoji Moro, Chiba-ken (JP); Ren Mukai, Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 0 days.

(21) Appl. No.: 09/573,255

(22) Filed: May 18, 2000

(30) Foreign Application Priority Data

May 21, 1999 (JP) ............................................ 11-141023

(51) Int. Cl.[7] ................................................. H05B 6/62
(52) U.S. Cl. ......................... 219/765; 219/777; 219/778
(58) Field of Search ................................. 219/765, 770, 219/777, 778, 780, 56, 61.4, 110, 108; 156/379, 272.2, 273.7, 272.7, 273.9, 379.6, 380.2, 380.4, 380.6

(56) References Cited

U.S. PATENT DOCUMENTS

| | | | |
|---|---|---|---|
| 5,237,147 A | * 8/1993 | Pazzaglia | 219/108 |
| 5,406,045 A | * 4/1995 | Kiriishi et al. | 219/110 |
| 5,844,193 A | * 12/1998 | Nomura et al. | 219/110 |
| 6,011,235 A | * 1/2000 | Mukai et al. | 219/110 |
| 6,046,424 A | * 4/2000 | Jochi | 219/110 |
| 6,137,077 A | * 10/2000 | Moro et al. | 219/108 |

* cited by examiner

Primary Examiner—Teresa Walberg
Assistant Examiner—Quang Van
(74) Attorney, Agent, or Firm—Wenderoth, Lind & Ponack, L.L.P.

(57) ABSTRACT

In odd-numbered current-supplying periods of a plurality of current-supplying periods constituting a gross current-supplying time, a control unit 42 allows continuous switching actions of only a first set of switching elements at an inverter frequency, with a second set of switching elements remaining OFF. In even-numbered current-supplying periods, the control unit 42 allows continuous switching actions of only the second set of switching elements at the inverter frequency, with the first set of switching elements (24, 28) remaining OFF. As a result of this, a secondary circuit of the power supply apparatus allows a secondary current $i_2$, namely a fusing current I having a substantially trapezoidal current waveform to flow in a positive direction in the odd-numbered current-supplying periods, and to flow in a negative direction in the even-numbered current-supplying periods.

3 Claims, 7 Drawing Sheets

FUSING PROCESSING METHOD

BACKGROUND OF THE INVENTION

1. Field of the Invention

The present invention relates to a fusing processing method making use of Joule heat and a pressurization force in order to crimp a workpiece.

2. Description of the Related Art

Figure 3A:
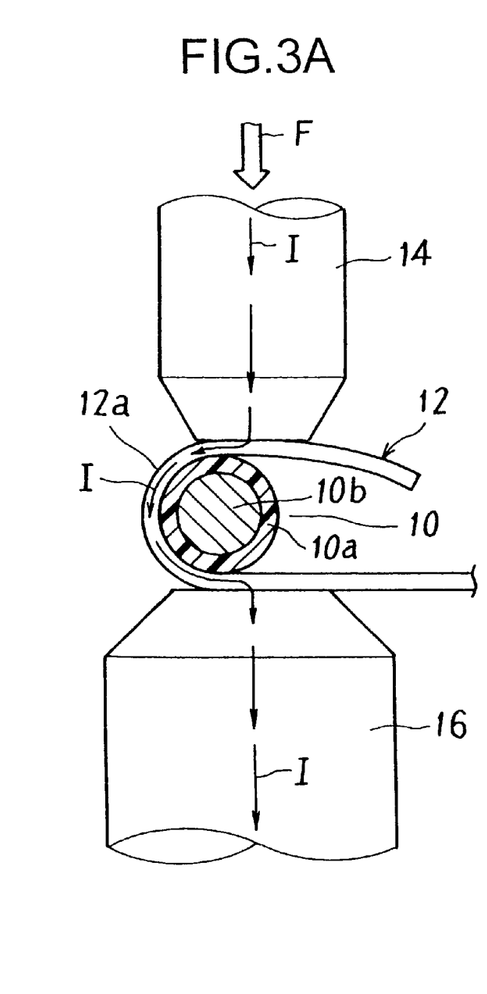
FIGS. 3A to 3C illustrate a fusing processing by way of example.
Figure 3B:
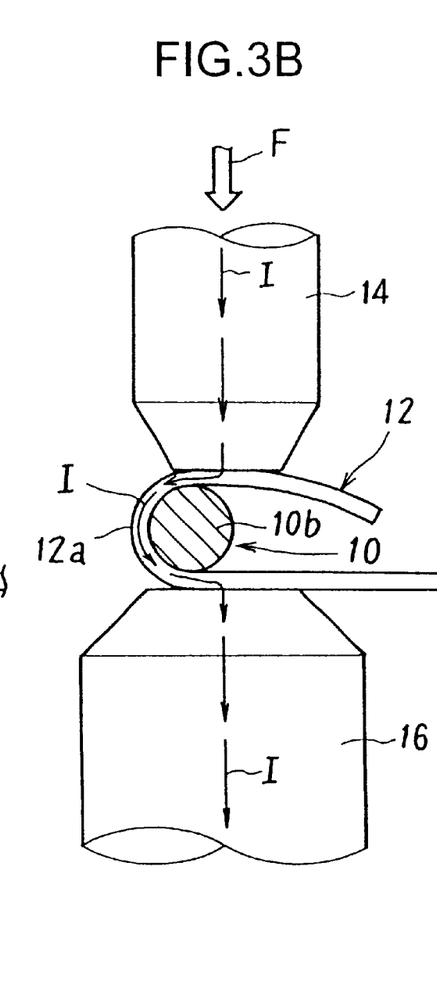
Figure 3C:
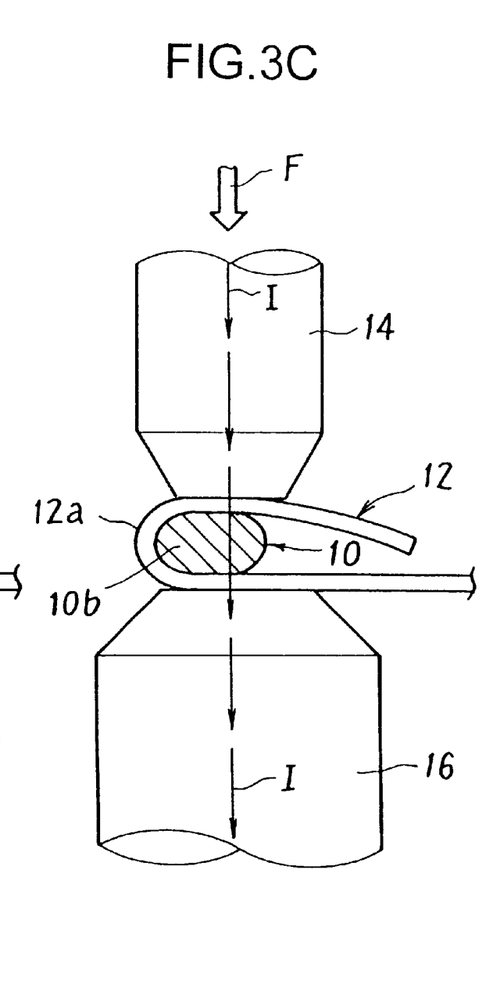

An exemplary fusing work is illustrated in FIGS. 3A to 3C. This work provides electrical and physical connections between a covered wire 10 and a strip-like terminal 12 made of e.g., copper or copper alloy.

Referring first to FIG. 3A, a workpiece is inserted between a pair of (e.g., upper and lower) electrodes 14 and 16, the workpiece consisting of the terminal 12 and the covered wire 10 embraced in a hooked portion or a bent portion 12a of the terminal 12. The undersurface of the terminal hooked portion 12a is carried by the lower electrode 16 at a fixed position, with the upper electrode 14 abutting against the top surface of the terminal hooked portion 12a so that the latter is pressed downward with a predetermined pressurizing force F by a pressure device not shown. At the same time, a predetermined voltage is applied to the two electrodes 14 and 16 by a power supply apparatus not shown.

Then, current I first flows, through the terminal hooked portion 12a providing a current path, between the pair of electrodes 14 and 16, to generate Joule heat at the terminal hooked portion 12a. As a result of this, an insulator 10a of the covered wire 10 melts by Joule heat and peels off a conductor 10b as illustrated in FIG. 3B.

Once the insulator 10a is removed, current I is allowed to flow, through the conductor 10b (typically, made of copper) of the covered wire 10, between the two opposing electrodes 14 and 16 as illustrated in FIG. 3C. During the current-supplying period as well, the pressurization force F is still continuously applied to the two electrodes 14 and 16, and hence Joule heat and pressurization force F act, in cooperation, to cause the terminal hooked portion 12a and the covered wire conductor 10b to be integrally pressure welded or pressure squashed for crimping. This enables the covered wire 10 and the terminal 12 to be electrically and physically joined together in a rigid fashion. Due to an extremely small resistance of the conductor 10b of the covered wire 10 and the terminal 12, no nugget will be generated therebetween.

Figure 6:
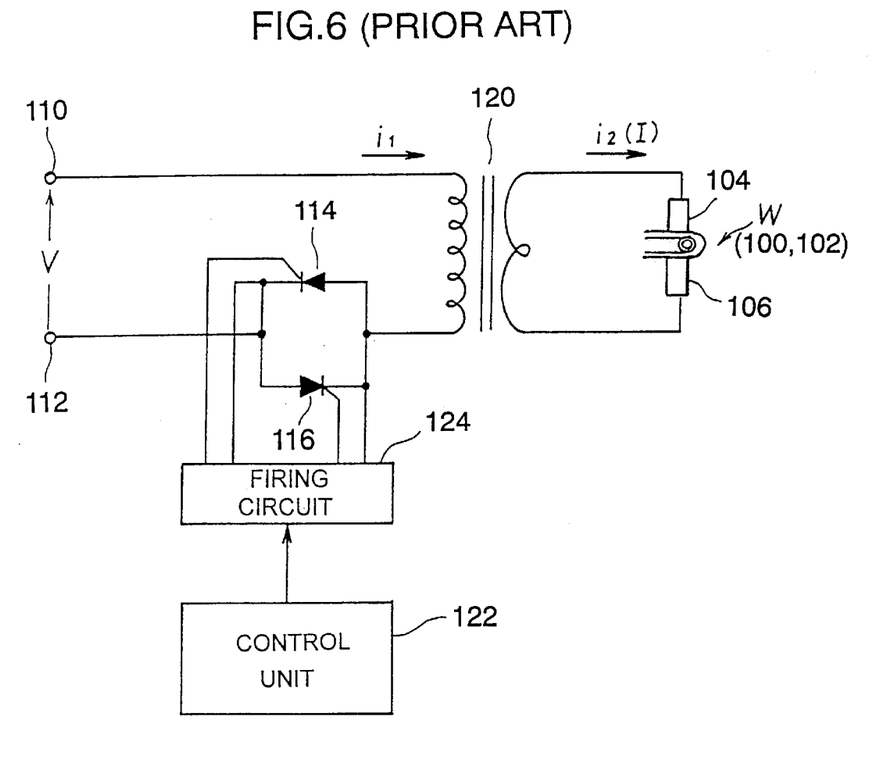
FIG. 6 is a circuit diagram showing a circuit configuration of a single-phase AC power supply apparatus that has hitherto been used for the fusing processing.
Figure 7:
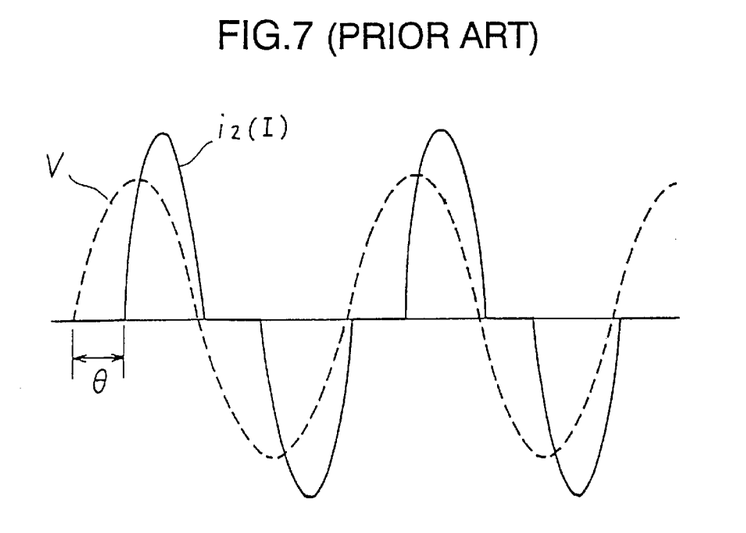
FIG. 7 illustrates waveforms of the voltage and current of the power supply apparatus of FIG. 6.

FIG. 6 illustrates a circuit configuration of a single-phase AC power supply apparatus that has hitherto been used for the fusing work as described above. FIG. 7 illustrates waveforms of the voltage and current delivered from the power supply apparatus.

In this power supply apparatus, a single-phase AC voltage V of a commercial frequency fed to input terminals 100 and 102 is applied to a primary coil of a step-down transformer 108 by way of a contactor that is comprised of a pair of thyristors 104 and 106. An AC induced electromotive force (secondary voltage) generated at the secondary coil of the transformer 108 is applied through the secondary conductor and the electrodes 14 and 16 to the workpiece W (10, 12) so as to allow a secondary current $i_2$ having a larger current value than that of a primary current $i_1$ to flow as the fusing current I through the secondary circuit.

The magnitude (effective value) of the fusing current I ($i_2$) is determined depending on a conduction angle. Due to the presence of a substantially fixed relation between a firing angle and the conduction angle, it may be said that the magnitude depends on the firing angle. This power supply apparatus provides a control of firing angles (firing timings) θ of the thyristors 104 and 106 by way of a firing circuit 112, to thereby control the effective value of the fusing current I ($i_2$).

Figure 8:
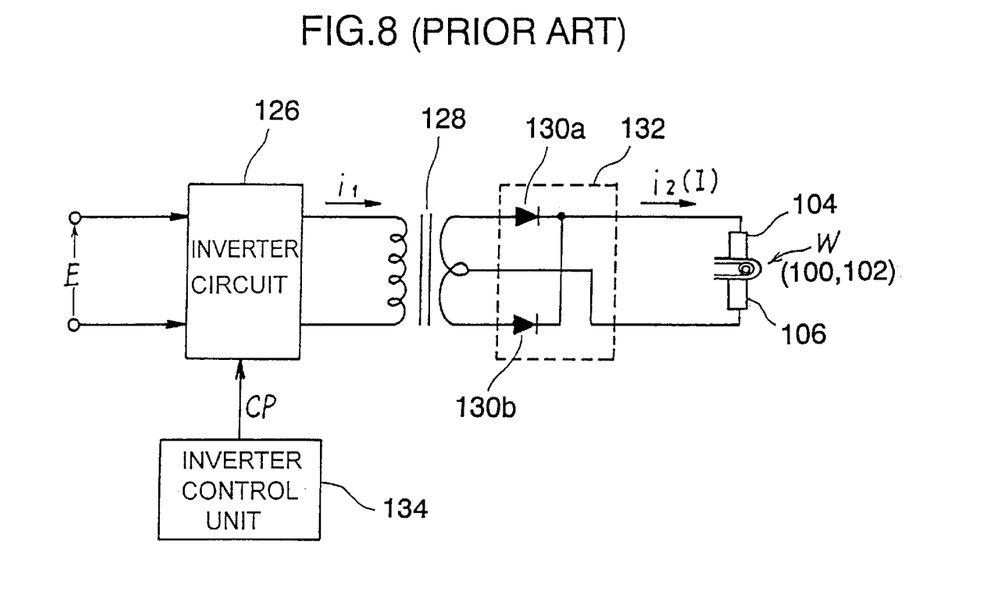
FIG. 8 is a circuit diagram showing a circuit configuration of a DC inverter power supply apparatus that has hitherto been used in the fusing processing.
Figure 9A:
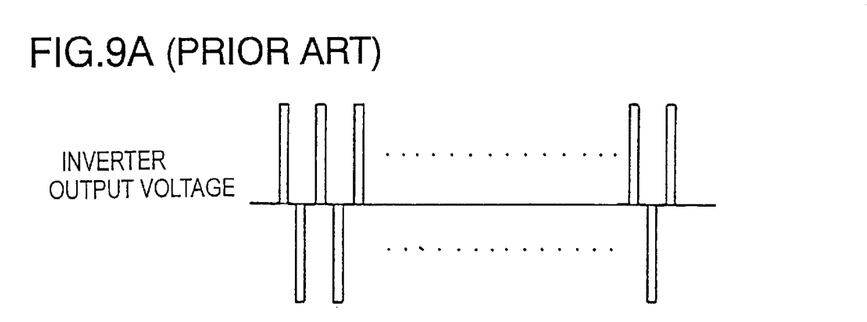
FIGS. 9A and 9B are diagrams showing waveforms of the voltage and current of the power supply apparatus of FIG. 8.
Figure 9B:
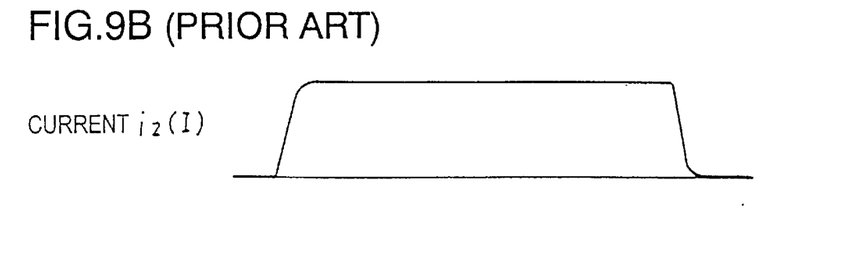
Figure 10A:
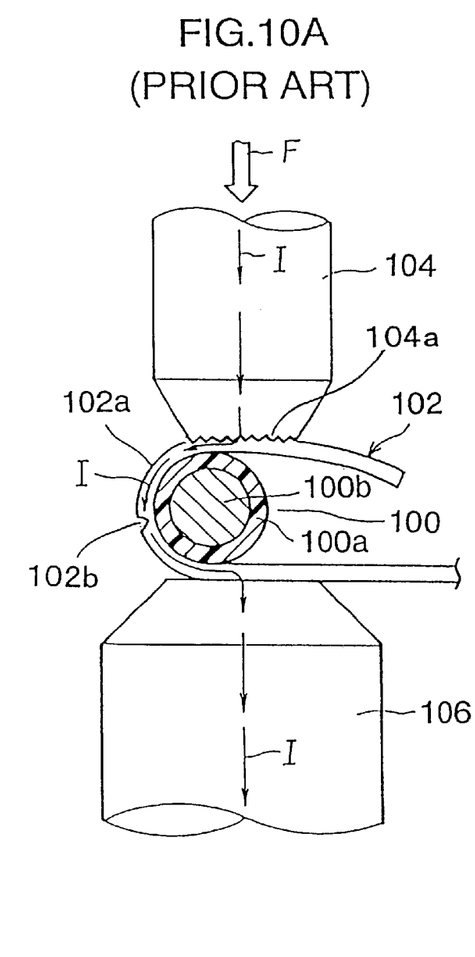
Figure 10B:
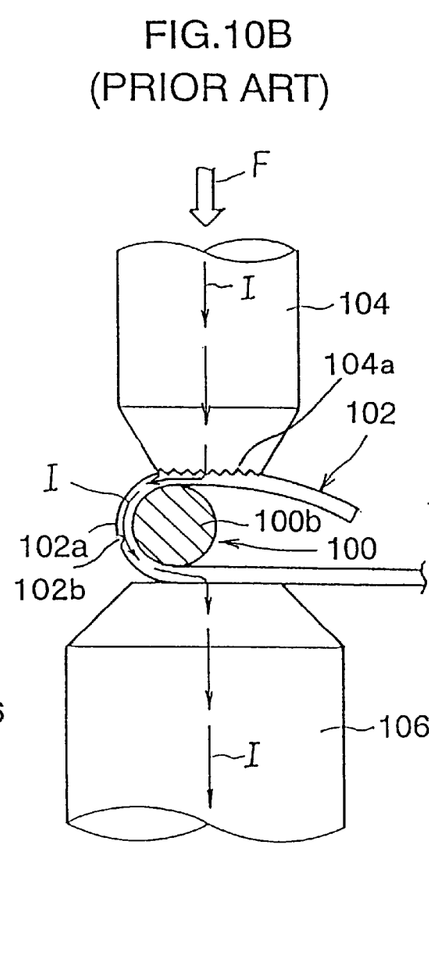
Figure 10C:
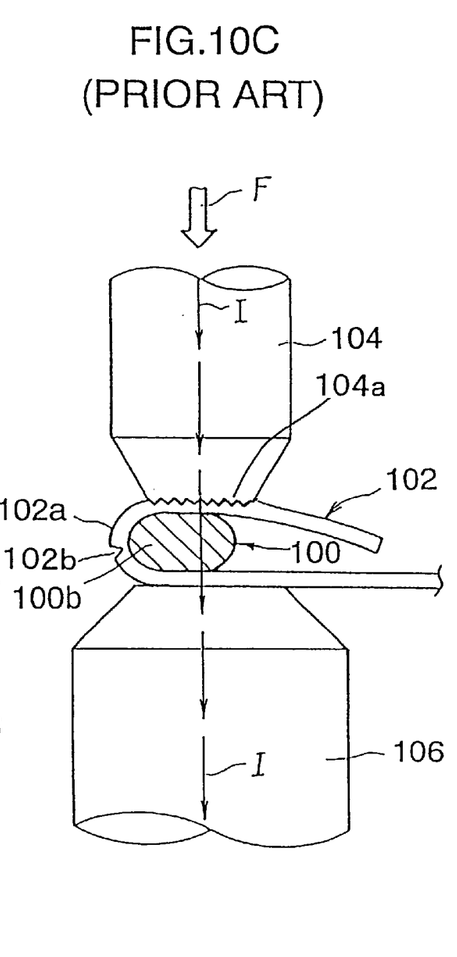

FIG. 8 illustrates a configuration of a DC inverter power supply apparatus that has hitherto been used in the fusing work. FIGS. 9A and 9B depict waveforms of the voltage and current output from the power supply apparatus.

This power supply apparatus comprises an inverter circuit 120 to which a DC voltage E is applied at a predetermined voltage level by a rectifying circuit not shown. The inverter circuit 120 includes switching elements and serves to issue high-frequency AC pulses in such a manner as to chop up the DC input voltage E at a high-frequency switching in response to a control pulse CP from a inverter control unit 128. The AC pulses output from the inverter circuit 120 are fed to a primary coil of a step-down transformer 122 so that AC pulses similar to those at primary side are acquired in the secondary coil. The secondary pulsed alternating current is converted into a direct current by a rectifying circuit 126 consisting of a pair of diodes 124a and 124b, with the secondary direct current $i_2$ being fed as a fusing current I to the workpiece W (10, 12) by way of the electrodes 14 and 16.

In such a conventional fusing processing method using the single-phase AC power supply apparatus, the ratio is small of the effective current-supplying time (the time during which current actually flows) to the gross current-supplying time, so that a current peak value needs to be increased in each current-supplying cycle if it is desired to supply a sufficient thermal energy for the fusing work. However, the increased current peak value tends to result in an increased instantaneous peak value of Joule heat generated in the workpiece, which may possibly cause undesirable deformations or damages as a result of heat shock to which the workpiece W may be subjected. In the example of FIGS. 3A to 3C, immediately after the commencement of current supply (i.e., at the stage of FIG. 3A), the bend of the hooked portion 12a of the terminal 12 may crack in the vicinity of its top due to the heat shock.

On the contrary, in the conventional fusing processing method using the DC inverter power supply apparatus, the ratio of the effective current-supplying time is large and its heat generating efficiency is high, so that a sufficient thermal energy can be supplied to the workpiece even at a relatively low current peak value, and thus any heat shock can be suppressed. However, this method is problematic in that since the fusing current I can flow between the two electrodes only in the same direction (polarity), the amount of heat generation may differ from place to place due to Peltier effect appearing between the electrodes 14, 16 and the workpiece W, whereupon the deformations and wears at the extremities of the electrodes are apt to concentrate in one electrode (typically, in the electrode 14 at positive side), which may result in a cumbersome maintenance and a rise in cost.

SUMMARY OF THE INVENTION

The present invention was conceived in view of the above problems. It is therefore the object of the present invention to provide a fusing processing method capable of preventing any heat shock on a workpiece to improve the work quality and evening out the wears and degradations of the electrodes to improve the maintenance (workability, costs).

According to an aspect of the present invention, in order to attain the above object, there is provided a method of fusing a workpiece in which a pair of electrodes are pressed against the workpiece while simultaneously a current flows through the pair of electrodes to the workpiece to generate Joule heat, the method comprising the steps of converting an AC voltage of a commercial frequency into a DC voltage by means of a rectifying circuit; converting the DC voltage output from the rectifying circuit, into a pulsed voltage of a high frequency by means of an inverter; passing the high-frequency pulsed voltage output from the inverter through a transformer, to apply it via the pair of electrodes to the workpiece without any rectification at secondary side of the transformer; and segmenting a current-supplying time for a single fusing processing into a plurality of current-supplying periods, to output the high-frequency pulses with one polarity from the inverter in odd-numbered current-supplying periods, but to output the high-frequency pulses with the other polarity from the inverter in even-numbered current supplying periods.

In a fusing processing method of the present invention, the inverter allows a high-frequency waveform-controlled current to flow between two electrodes in each current-supplying period, whereby it is possible to achieve a high heat generating efficiency and hence to supply a sufficient heat energy to the workpiece even with a relatively low current peak value. This prevents the workpiece from being subjected to any heat shocks, enabling a stabilized fusing quality to be acquired. Furthermore, the polarity (direction) of current flowing between the two electrodes during the current-supplying time is inverted for each current-supplying period so that Peltier effect appearing between the electrodes and the workpiece is cancelled out or evened out and the amount of heat generation is also uniformed, thereby preventing deformations and wears at the electrode extremities from concentrating in one electrode, to ensure a fine finish in the fusing processing.

BRIEF DESCRIPTION OF THE DRAWINGS

The above and other objects, aspects, features and advantages of the present invention will become more apparent from the following detailed description when read in conjunction with the accompanying drawings.

DESCRIPTION OF THE PREFERRED EMBODIMENTS

The present invention will now be described with reference to FIG. 1, FIGS. 2A and 2B and FIGS. 3A to 3C which illustrate one embodiment thereof.

Figure 1:
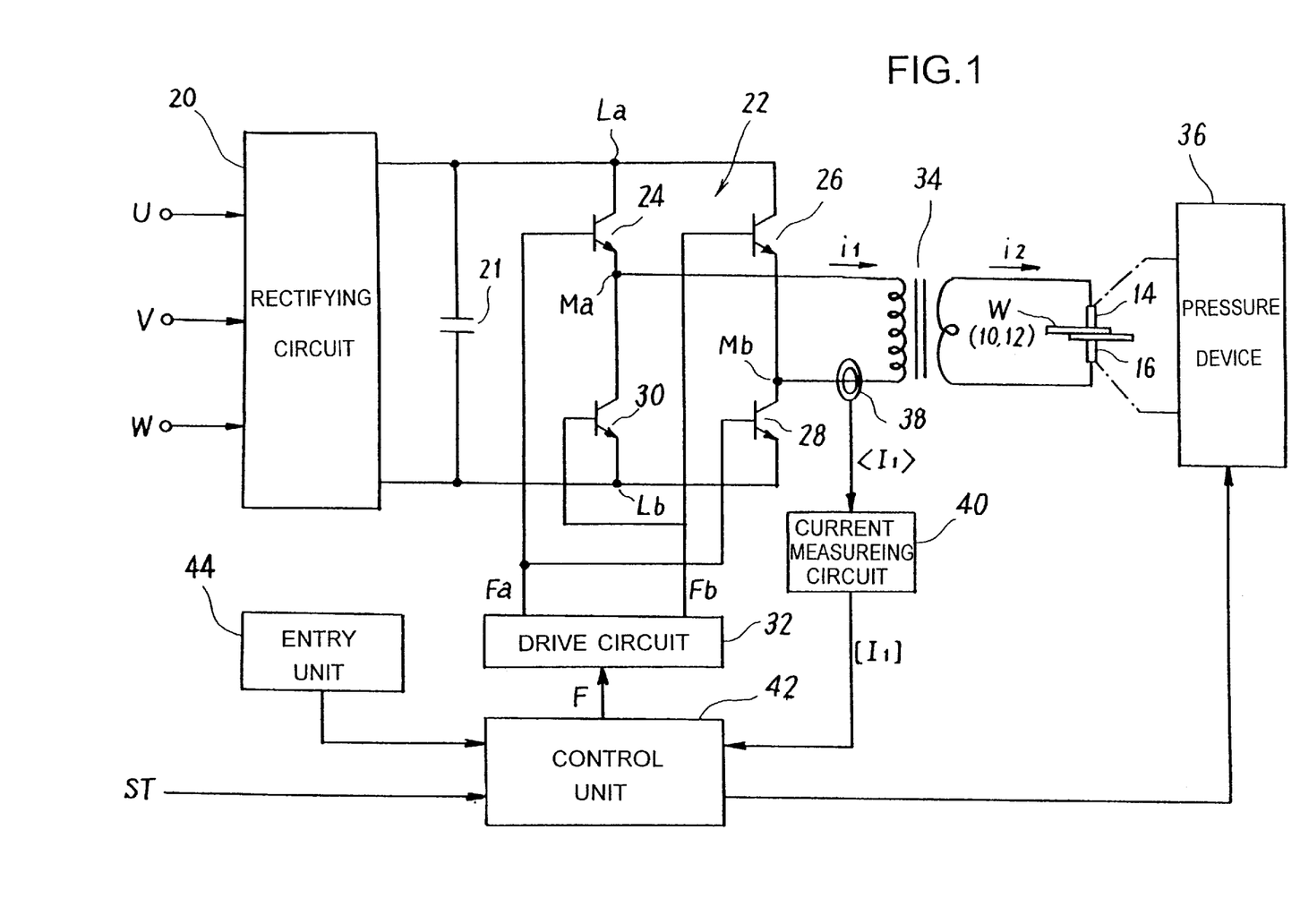
FIG. 1 is a circuit diagram showing a circuit configuration of a power supply apparatus for use in a fusing processing method in accordance with an embodiment of the present invention.

FIG. 1 shows a circuit configuration of a power supply apparatus for carrying out a fusing processing method in accordance with the present invention.

The power supply apparatus comprises an inverter generally designated at 22 which includes four transistor switching elements 24, 26, 28 and 30 in the form of, e.g., GTRs (giant transistors) or IGBTs (insulated gate bipolar transistors). Of the four switching elements 24 to 30, a first set of (positive side) switching elements 24 and 28 are subjected at one time to a switching (on/off) control at a predetermined inverter frequency (e.g., 10 kHz) in response to a first inverter control signal Fa from a drive circuit 32, whilst a second set of (negative side) switching elements 26 and 30 are subjected at one time to a switching control at the inverter frequency in response to a second inverter control signal Fb from the drive circuit 32.

The inverter 22 has input terminals (La, Lb) connected to output terminals of a rectifying circuit 20 and has output terminals (Ma, Mb) connected to ends of a primary coil of a step-down transformer 34. To ends of a secondary coil of the transformer 34 there are connected a pair of electrodes, e.g., upper and lower electrodes 14 and 16 as best seen in FIG. 3, by way of secondary conductors only, without intervention of any rectifying circuit. The two electrodes 14 and 16 are positioned away from (e.g., confronting) each other and are brought into pressure contact with workpieces W (10 and 12) by a pressurization force from a pressure device 36.

The rectifying circuit 20 is a three-phase rectifier consisting of e.g., six (6) diodes that are three-phase bridge connected to one another. The rectifying circuit 20 converts a three-phase AC voltage at a commercial frequency from a three-phase AC power supply terminal (U, V, W), into a DC voltage. The DC voltage output from the rectifying circuit 20 is fed via a smoothing capacitor 21 to the inverter 22. A current sensor 38 in the form of, e.g., a current transformer is attached to a conductor extending between the output terminal of the inverter 22 and the primary coil of the transformer 34. During a current supply for a fusing processing, the current sensor 38 issues a current detection signal <$I_1$>indicative of an instantaneous value of a primary current $i_1$ having a waveform similar to that of a secondary current $i_2$ (fusing current I) which passes through the secondary circuit. For each switching cycle of the inverter, a current measuring circuit 40 figures out, as a current measured value [$I_1$], an effective value or average value of the current $i_1$ on the basis of the current detection signal <$I_1$>from the current sensor 38 and feeds the thus obtained current measured value [$I_1$] to a control unit 42.

The control unit 42 is comprised of a microcomputer that includes a CPU, a ROM (program memory), a RAM (data memory), a clock circuit and an interface circuit, to provide all controls effected within the apparatus, for example, pressurization control and current control in the fusing processing, and their sequence controls, management of setting entries and registrations associated with set values for various conditions, and output control of measured values and judged values, etc. In this embodiment the fusing processing is initiated in response to a start signal ST from an external apparatus not shown.

An entry unit 44 is comprised of entry devices such as a keyboard and a mouse, for use in setting entries of various conditions for fusing processing. Major conditions set and entered in this embodiment include a current-supplying time $T_G$, a current-supplying period $T_A$, and a current value $I_C$ for constant-current control.

Of these fusing conditions, the current-supplying time $T_G$ is a gross current-supplying time from the initiation of fusing current supply to the termination thereof, which can be defined as the number of cycles that is equal to the integer multiples or even multiples of the current-supplying period $T_A$ that is a half cycle. The current-supplying period $T_A$ is a single independent current-supplying period during which the inverter 22 performs switching actions in a continuous manner at positive side or negative side, which can be defined as a period corresponding to a half cycle at the commercial frequency (50 Hz or 60 Hz) for example. The current value $I_C$ for constant-current control is a reference value that is used when a constant-current control is provided after the rise of current in each current-supplying period $T_A$.

Description will then be made of operative functions of this embodiment. The fusing processing of FIG. 3 is carried out by way of example.

As shown in FIG. 3A, this embodiment also allows a workpiece W to be inserted between the upper electrode 14 and the lower electrode 16, the workpiece W consisting of a terminal 12 and a covered wire 10 placed inside of a hooked portion 12a of the terminal 12. The lower electrode 16 carries the undersurface of the terminal hooked portion 12a at a fixed position, while simultaneously the upper electrode 14 is abutted against the top surface of the terminal hooked portion 12a so that the pressure device 36 can press the workpiece W downward with a predetermined pressurization force F. At the same time as this, the current supply is initiated.

In this embodiment the control unit 42 of the power supply apparatus provides a current-supplying sequence control. As is apparent from FIGS. 2A and 2B, in odd-numbered current-supplying periods $T_{AO}$ of a plurality of current-supplying periods $T_A$ constituting the gross current-supplying time $T_G$, the control unit 42 allows continuous switching actions of the first set of (positive side) switching elements (24, 28) at an inverter frequency, with the second set of (negative side) switching elements (26, 30) remaining OFF. In even-numbered current-supplying periods $T_{AE}$, the control unit 42 allows continuous switching actions of the second set of (negative side) switching elements (26, 30) at the inverter frequency, with the first set of (positive side) switching elements (24, 28) remaining OFF.

Figure 2A:
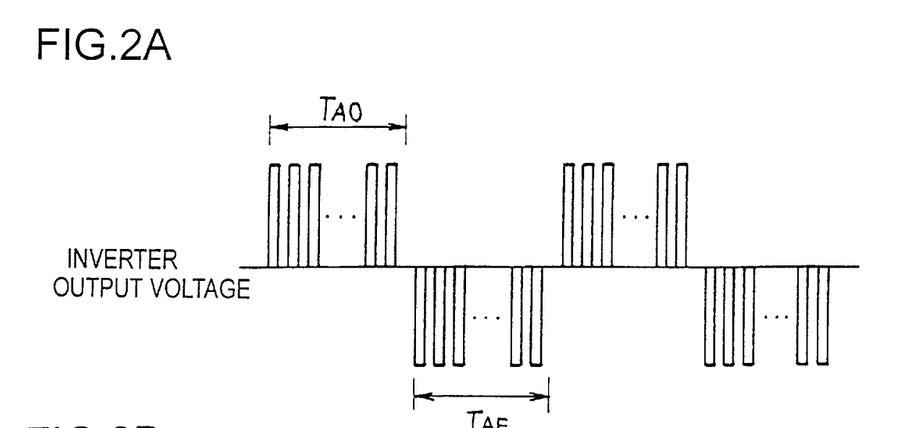
FIGS. 2A and 2B are diagrams showing waveforms of the voltage and current, respectively, of the power supply apparatus of this embodiment.
Figure 2B:
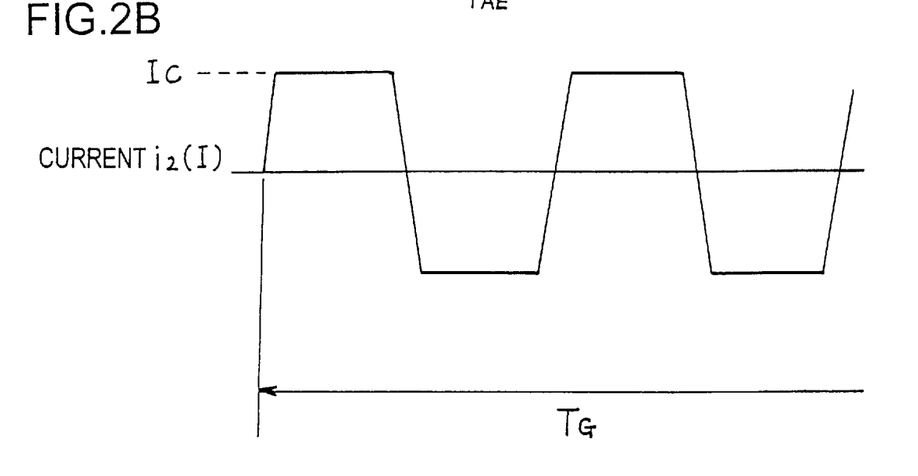

As a result, the secondary circuit of the power supply apparatus allows a secondary current $i_2$, namely a fusing current I having a substantially trapezoidal current waveform to flow in the positive direction in the odd-numbered current-supplying periods $T_{AO}$, but to flow in the negative direction in the even-numbered current-supplying periods $T_{AE}$. The control unit 42 uses as a feedback signal a current measured value [$I_1$] from the current measuring circuit 40, to cause the current value at the upper side of the trapezoidal current waveform to coincide with a set value $I_C$ by means of a PWM (pulse-width modulation) control for example.

Thus, in each current-supplying period $T_A$ the fusing current I having a trapezoidal current waveform flows between the electrodes 14 and 16, whereupon a higher heating efficiency is achieved so that a sufficient thermal energy can be supplied to the workpiece W even at a relatively low current peak value IC. For this reason, Joule heat sufficient to melt an insulator 10a of the covered wire 10 can be generated while preventing an occurrence of any heat shock at the workpiece W, in particular, at the terminal hooked portion 12a.

In this embodiment as well, after removal of the insulator 10a the current I flows between the two electrodes 14 and 16 through a conductor 10b of the covered wire 10 as shown in FIG. 3C, to generate Joule heat at both the terminal 12 and the covered wire 10. This Joule heat and the pressurization force F from the pressure device 36, in cooperation, cause the terminal hooked portion 12a and the covered wire conductor 10b to be integrally pressure welded or pressure squashed for crimping.

At the elapse of the gross current-supplying time TG, the control unit 42 brings the inverter 22 to a complete halt to terminate the current supply and, at a predetermined timing, cancels the pressurization force F applied by the pressure device 36.

Figure 4:
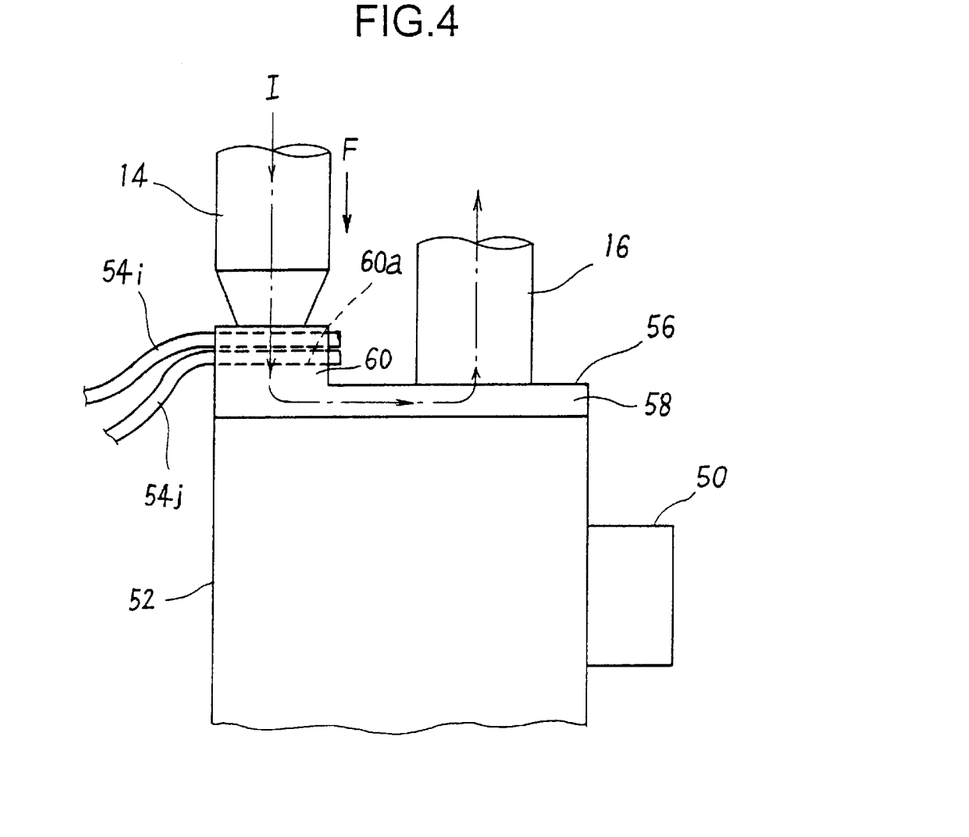
FIG. 4 is a side elevational view showing another example of the fusing processing of the embodiment.
Figure 5A:
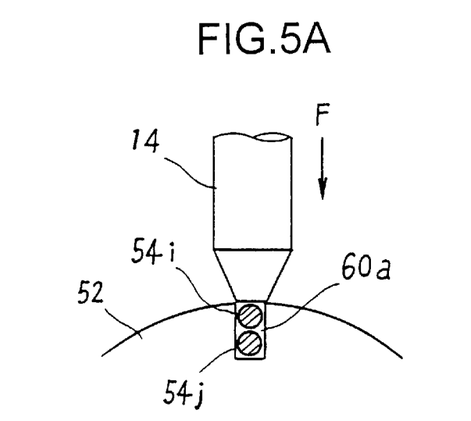
FIGS. 5A and 5B are fragmentary sectional views showing a major part in the fusing processing of FIG. 4.
Figure 5B:
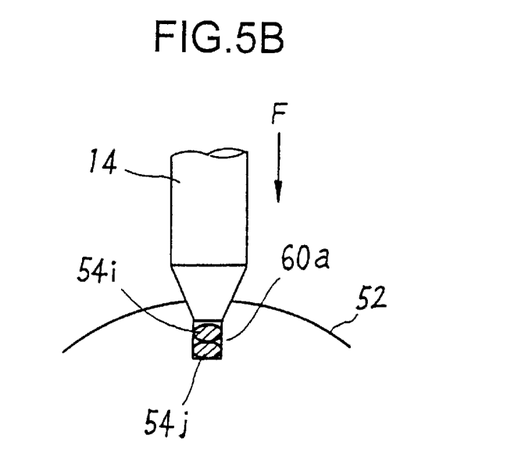

The fusing processing method of the present invention is applicable by way of example to a joint between an armature winding and a commutator of a DC motor as illustrated in FIG. 4 and FIGS. 5A and 5B. Ends 54i and 54j of insulated coils constituting the armature winding are received in a slot 60a in each slot block of a commutator 52 rigidly secured to a motor shaft 50, and the pressurization and current supply are carried out by means of the electrodes 14 and 16. Immediately after the initiation of the current supply, current I does not flow through the coil ends 54i and 54j, bypassing the slot 60a since the coil ends 54i and 54j are coated with an insulator. Then the electrode 14 and the slot 60a generate a heat by the action of Joule heat, so that the resultant heat melts the insulating coatings of the coil ends 54i and 54j to cause the coil conductors to be exposed. Afterward, the current I can flow through the coil conductors of the coil ends 54i and 54j, allowing the coil ends 54i and 54j to generate a heat by the action of Joule heat. The thus heat-generating coil ends 54i and 54j fuse as illustrated in FIGS. 5A and 5B under the pressurization force F from the pressure device 36, to be crimped to a terminal portion 60.

Since this embodiment allows the polarity (direction) of the fusing current I flowing between the two electrodes 14 and 16 during the current-supplying time TG to be inverted at a certain cycle (TA), Peltier effect appearing between the electrodes 14, 16 and the workpiece W is cancelled out or evened out, so that deformations or wears at the electrode extremities are prevented from being localized toward one side, to thereby reduce the number of times of replacement or maintenance of both the electrodes 14 and 16. Furthermore, due to the less degree of deformations or wears at the electrode extremities in addition to the absence of the heat shock as described above, a stabilized fusing processing is ensured and an improved work quality is achieved.

Although in the above embodiment the three-phase alternating current of the commercial frequency is converted into a direct current for the supply to the inverter 22, a single-phase alternating current of the commercial frequency maybe converted into a direct current. The circuit configuration of the inverter 22 is also a mere example, and various modifications would be possible. The current waveform in each current-supplying period $T_A$ is not limited to the trapezoidal waveform as in the above embodiment, but instead any arbitrary current waveform may be provided by use of PWM control for example. The fusing processing of FIGS. 3A to 3C is also a mere example, and the present invention would be applicable to other various fusing processing.

As set forth hereinabove, according to the fusing processing method of the present invention, any heat shock which may be applied to the workpiece is prevented to improve the work quality, and wear and degradation of the electrodes it evened out to improve the maintenance.

What is claimed is:

1. A fusing processing method comprising:

inserting a portion of a covered wire to be fused into a receptacle portion of a conductor, both the portion of the covered wire and the receptacle portion of the conductor constituting a workpiece;

placing the workpiece between a first electrode and a second electrode;

applying a pressing force to the workpiece through the first and second electrodes so that the first and second electrodes are abutted against the workpiece to be fused;

segmenting a current-supplying time for a single fusing processing into a plurality of current-supplying periods, to cause a fusing current to flow between the first and second electrodes in a positive direction in odd-numbered current-supply periods of the plurality of current supply periods, and to cause the fusing current to flow between the first and second electrodes in a negative direction in even-numbered current-supply periods of the plurality of current supply periods; and allowing the fusing current to flow between the first and second electrodes without flowing through the covered wire immediately after initiation of the current-supplying time and to then flow through a conductor of the covered wire after an insulator of the covered wire is removed.

2. A fusing processing method according to claim 1, further comprising:

converting an AC voltage of a commercial frequency into a DC voltage by using a rectifying circuit;

converting the DC voltage output from the rectifying circuit into a high-frequency pulsed voltage by using an inverter; and impressing the high-frequency pulsed voltage output from the inverter through a transformer and between the first and second electrodes to create the fusing current across the workpiece without any rectification at a secondary side of the transformer.

3. A fusing processing method according to claim 2, further comprising:

detecting a current waveform on a primary side or the secondary side of the transformer to measure a current value of the current waveform; and controlling the inverter so that the current value at an upper side of the current waveform coincides with a set value.

* * * * *